United States Patent Office 3,334,138
Patented Aug. 1, 1967

3,334,138
POLYMERIC QUATERNARY AMMONIUM
COMPOUND
James F. Feeman, Wyomissing, Pa., assignor to Crompton & Knowles Corporation, Worcester, Mass., a corporation of Massachusetts
No Drawing. Filed Aug. 2, 1963, Ser. No. 299,492
5 Claims. (Cl. 260—567.6)

This invention relates to a new polymeric nitrogenous quaternary compound which is useful as a substantive fixative for dye cellulosic textiles, to increase their fastness to wet treatments (such as washfastness and fastness to cold water leaching) with a minimum effect on light fastness.

Fixatives now commercially available are subject to one or more of the following objections. Either they adversely reduce the light fastness of the dyes or in those instances where light fastness is not significantly lowered the dyeings exhibit an objectionable amine (fishy) odor after wet treatments such as washing or any alkaline or high temperature treatment.

Accordingly, it is one object of this invention to provide a substantive fixative which will not develop objectionable odors in the dyeings after wet treatments and which will minimize the adverse effect on light fastness.

These objects are accomplished in accordance with this invention by the use of a water soluble polymeric composition having the following structure:

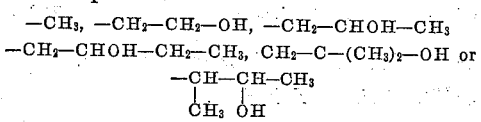

wherein R represents $-CH_3$, $-CH_2-CH_2-OH$, $-CH_2-CHOH-CH_3$
$-CH_2-CHOH-CH_2-CH_3$, $CH_2-C-(CH_3)_2-OH$ or

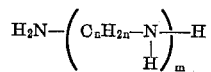

and wherein at least one of the R groups attached to each of the nitrogens is $-CH_3$ and wherein at least one-half of the nitrogen atoms present in the polymer are attached to a hydroxyalkyl group from the foregoing group; $n$ represents either 2 or 3 and $m$ is a whole number above 100.

The compounds of this invention are prepared from polyalkylene imines such as polyethylene imine or polypropylene imine. The imines are reacted with an alkylene oxide such as ethylene, propylene or butylene oxide and the resulting product is then quaternized.

The imines which can be used in preparaing the fixatives of this invention are the polyethylene and polypropylene imines which have the following formula:

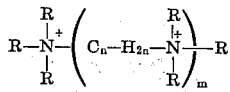

wherein $n$ is either 2 or 3 (so as to give the polyethylene or polypropylene imine) and $m$ is a whole number greater than 100. If $m$ is less than 100, the resulting end products do not fasten the dyes efficiently and exhibit poor washfastness. The upper limit for $m$ is not critical so long as the viscocity is not increased to a point where the fixative end product cannot be employed in conventional after treatments or so long as the water solubility of the end product will permit its application to dyeings from aqueous solutions in concentrations of about 0.1 to 2% by weight of the bath. A preferred composition according to the invention is one in which $n$ is 2 and $m$ is a whole number between 500 and 1500.

The foregoing polyalkylene imines are reacted with lower alkylene oxides such as ethylene, propylene or butylene oxide taking suitable precautions to control the reaction rate. The compositon of the end product will vary with the ratio of the imine and oxide employed. It is preferred to employ the imine and oxide in ratios which will form an end product in which each nitrogen of the polymer has at least one substituent methyl group and in which at least one half of the nitrogens of the polymer will have an alkyl hydroxy substituent group. If the alkyl hydroxy substitution is effected in fewer than 50% of the nitrogens, dyeings aftertreated with the compound will begin to develop objectionable odors and the odor will increase as the degree of alkyl hydroxy substitution decreases.

The imine-oxide reaction product is then quaternized with suitable alkylating agents, for example, dimethyl sulfate. The quantity of alkylating agent employed will depend on the degree of hydroxyalkylation of the polymeric imine and should be sufficient to quaternize all nitrogens present in the polymer. Failure to substantially completely quaternize the polymer will detract from the washfastness and light fastness of the aftertreated dyed fabrics.

In use, the polymeric compounds of this invention are applied to dyed cellulosic materials in the same manner as aftertreating fixatives and are generally applied to the dyeings as an aqueous solution and in quantities ranging from 0.1 to 2% of the weight of the material undergoing treatment.

The following examples will serve to illustrate and amplify other features of the invention. In these examples unless otherwise indicated all temperatures are in degrees centigrade, parts are by weight and percentages are in percentages by weight.

Example 1

Polymerized ethylene imine (43 parts) having a molecular weight of 30,000 to 40,000 dissolved in 129 parts of water was charged into a closed stainless steel reactor, the reactor was purged with nitrogen, evacuated, and the solution heated to 80°. At 80–90° during two hours ethylene oxide (44 parts) was added at the top of the reactor maintaining about 40 lbs. per square inch pressure. When the ethylene oxide had reacted completely, the resultant solution was cooled. It was then treated during one hour at 40–45° with dimethyl sulfate (126 parts). The pH of the solution was allowed to fall to 9, and then was controlled at 9 to 10 by addition of sodium hydroxide (about 15 parts) as 50% solution. When the pH remained stable at 9 for several hours, hydrochloric acid was added to adjust the solution to pH 5.5.

The clear, colorless solution of polymeric quaternary compound was used for aftertreating dyeings of direct dyes on cellulosic textiles, imparting to the dyeings greatly increased fastness to wet treatments, and lowering the fastness to light of the dyeings only slightly. No undesirable amine type odors were generated when the fabrics were subjected to alkaline or hot treatment such as ironing, drying, curing, heat setting, or washing.

When proceeding according to the description of Example 1, but substituting the amounts of ethylene oxide and of dimethyl sulfate given in the following table similar products were obtained which varied in a regular manner in their dye-fastening capability and freedom from amine odor on treatment with heat and alkali or heat alone. In general, proceeding from Example 2 to Example 13, the wash fastness of treated dyed cellulosic fabric increases, while generation of amine odor begins to become objectionable when the amounts of reactants employed in Example 9 are used, and increases as the amount of ethylene oxide is further decreased (Examples 10 to 13 inclusive). The combination of properties of fastness to wet treatments and lack of generation of amine odors appears to be optimum in dyeings treated with the products of Examples 5 through 8.

| Example Number | Ethylene oxide (Parts) | Dimethyl Sulfate (Parts) |
|---|---|---|
| 2 | 88 | 126 |
| 3 | 66 | 126 |
| 4 | 51.4 | 126 |
| 5 | 39.6 | 143 |
| 6 | 36.6 | 148 |
| 7 | 35.2 | 156 |
| 8 | 30.8 | 169 |
| 9 | 22 | 190 |
| 10 | 17.6 | 202 |
| 11 | 13.2 | 214 |
| 12 | 8.8 | 228 |
| 13 | 4.4 | 240 |

*Example 14*

Viscose rayon rug fabric (100 parts) previously dyed with 2 parts of C. I. Direct Blue 100, was padded in a solution of 1 part of the product of Example 6 in 100 parts of water and dried. No objectionable amine odor developed. The resultant fabric was tested as follows— a 2″ x 4″ cutting was rolled in a 2″ x 5″ multifiber fabric, tied and immersed in 250 ml. of deionized water and held at 130° F. for two hours. The fabric was then air dried and there was no indication of leaching of the dye from the dyeing to the multifiber. The dyeing showed only slight loss in color intensity and shade upon exposure for 80 hours in the Fade-O-Meter.

*Example 15*

Polymerized ethylene imine (43 parts) having a molecular weight of 30,000 to 40,000 dissolved in 129 parts of water was cooled by addition of 100 parts of ice and, with vigorous stirring, was treated with 29 parts of propylene oxide. The temperature was kept at 10–20° for four hours by external cooling. The resultant product was treated during one hour at 40–45° with dimethylsulfate (189 parts) while controlling the pH at 9–10 with 50% sodium hydroxide solution. After the pH no longer changed, it was adjusted to 5.5 with hydrochloric acid.

The clear, colorless solution had similar properties to that of Example 1.

*Example 16*

In Example 15, while otherwise proceeding as described, when the 29 parts of propylene oxide was replaced with 36 parts of 1,2-butylene oxide a product solution having similar properties was obtained.

I claim:

1. A water soluble polymeric composition having the following structure:

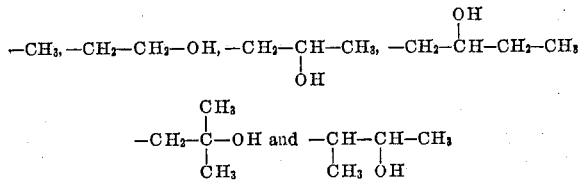

wherein R is a radical selected from the group consisting of $$-CH_3, -CH_2-CH_2-OH, -CH_2-CH-CH_3, -CH_2-CH-CH_2-CH_3$$
$$\qquad\qquad\qquad\qquad\quad\ \ |\qquad\qquad\ \ |$$
$$\qquad\qquad\qquad\qquad\quad\ \ OH\qquad\qquad OH$$

$$\qquad\ \ CH_3$$
$$\qquad\ \ |$$
$$-CH_2-C-OH\ \text{and}\ -CH-CH-CH_3$$
$$\qquad\ \ |\qquad\qquad\ \ |\qquad\ |$$
$$\qquad\ \ CH_3\qquad\quad CH_3\ \ OH$$

and wherein at least one of the R groups attached to each of the nitrogens is —CH$_3$ and wherein at least one-half of the nitrogen atoms present in the polymer are attached to a hydroxyalkyl group from the foregoing group, $n$ represents the same integer selected from 2 and 3 and $m$ is a whole number above about 100.

2. A composition according to claim 1 wherein $n$ is 2.
3. A composition according to claim 1 wherein $n$ is 3.
4. A composition according to claim 2 wherein $m$ is a whole number between 500 and 1500.
5. A composition according to claim 4 wherein the hydroxy alkyl substituent is —CH$_2$—CH$_2$—OH.

References Cited

UNITED STATES PATENTS 3,166,590   1/1965   Tsou _____ 260—570.5

CHARLES B. PARKER, *Primary Examiner.*

R. HINES, *Assistant Examiner.*